UNITED STATES PATENT OFFICE.

JOHN GIRDWOOD, OF CARRICKFERGUS, IRELAND.

REMEDY FOR ASTHMA.

SPECIFICATION forming part of Letters Patent No. 333,513, dated January 5, 1886.

Application filed August 24, 1885. Serial No. 175,243. (No specimens.) Patented in England February 24, 1885, No. 2,465.

*To all whom it may concern:*

Be it known that I, JOHN GIRDWOOD, of Woodburn, Carrickfergus, Ireland, linen-manufacturer, do hereby declare the nature of my invention for Remedy for Asthma and other Affections of the Throat, Chest, and Lungs, and in what manner the same is to be performed, to be particularly described and ascertained in and by the following statement:

My invention consists in the use of a combination of ground stramonium-leaves and powdered saltpeter with ground cascarilla-bark, ground Indian hempseed, and sifted white sugar, each reduced to an impalpable powder and all intimately intermixed in certain proportions—that is to say, four pounds, in weight, of stramonium-leaves; two pounds, in weight, of saltpeter; one pound, in weight, of cascarilla-bark; one pound, in weight, of white sugar, and one ounce, in weight, of Indian hempseed.

When a narcotic ingredient would be injurious or offensive to the person afflicted with any of the affections to which this remedy is applicable, I may omit the ground Indian hempseed above mentioned from the combination. I may also add to the ingredients above enumerated the powder of mullien leaves and roots—say half a pound weight of each—especially where it is necessary or desirable to allay an acute attack and augment the soothing effects of the treatment; or I may dispense with part of the stramonium-leaves—not exceeding one-half the quantity I have specified—and substitute therefor an equal weight of powdered mullein leaves and roots in equal quantities. The ingredients being made quite dry, are, in that condition, intimately intermixed, and when the intermixture is completed I moisten the product with about four quarts of boiling water, barely bringing it to the consistency of a fluid, and I afterward heat it slowly in a shallow pan or dish until all moisture is driven off. The ingredients thus combined and dried produce a hard substance, which I thereupon grind or otherwise reduce to a fine powder and preserve in a substantially air-tight box, case, or bottle.

The person to be subjected to treatment with my remedy is placed in a closed chamber or room, in which a teaspoonful or more of the powder is set fire to and burned upon a plate, and the inhalation of the smoke or vapor produced by its reduction gives immediate relief and restores the patient.

Having now particularly described and ascertained the nature of my said invention, and in what manner the same is to be performed, I declare that what I claim is—

The within-described remedy for asthma, consisting of a composition of stramonium-leaves, saltpeter, cascarilla-bark, and sugar, in the proportions substantially as set forth.

In testimony whereof I have signed my name to this specification in the presence of two subscribing witnesses.

JOHN GIRDWOOD.

Witnesses:
 HUGH HYNDMAN,
 A. B. WOOD.